M. BATES.
Seed-Planter.
No. 15,755.
Patented Sept. 23, 1856.
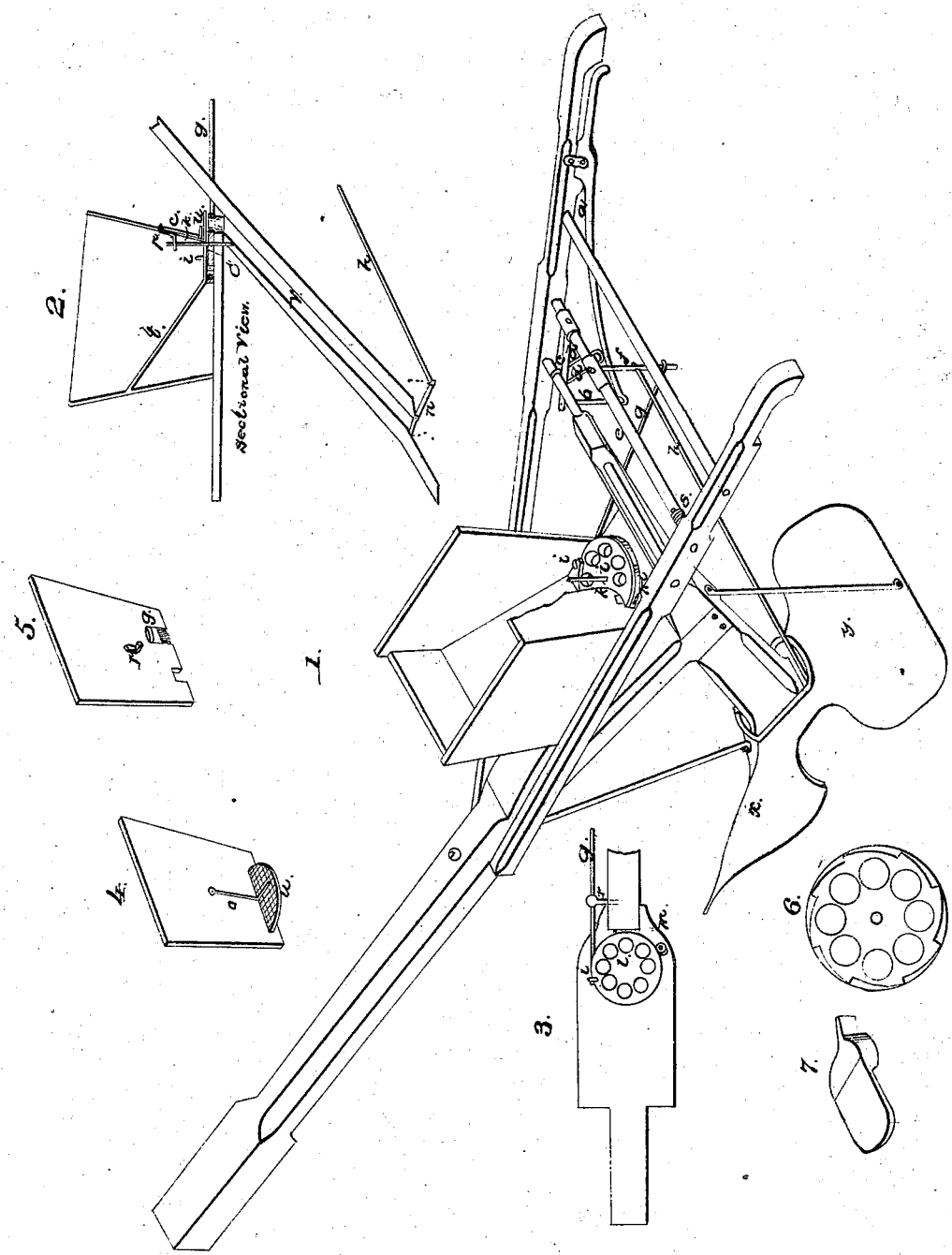

UNITED STATES PATENT OFFICE.

MALENDER BATES, OF CARLTON, NEW YORK.

IMPROVEMENT IN CORN-PLANTERS.

Specification forming part of Letters Patent No. 15,755, dated September 23, 1856.

*To all whom it may concern:*

Be it known that I, MALENDER BATES, of Carlton, in the county of Orleans, in the State of New York, have invented a new and useful machine for planting corn to range in rows both ways in hills any desired distance apart; and I do declare that the following is a full, clear, and exact description of the construction and operation of the same, reference being had to the accompanying drawings, making a part of this specification, in which—

Figure 1 is a perspective view; Fig. 2, a longitudinal section through stock-wheel and hopper; Fig. 3, a top view of wheel and bottom of hopper; Fig. 4, a view of the outside of the back part of the hopper and wire screen covering one half of the wheel; Fig. 5, a view of the inside of the back part of the hopper and brush and staple or button; Fig. 6, a view of the wheel inverted; Fig. 7, a view of the valve.

To enable others skilled in the art to make and use my invention, I will proceed to describe the construction and operation.

I construct the frame-work of my corn-planter on the most approved plan of a corn or shovel plow, with a hopper a little above the beam, with one end of the bottom resting on a shoulder on the front side of the stock, near the top, the other end on the beam one foot from the stock.

For conveying the seed from the hopper to the ground, I make a tube of the stock by boring an inch hole down through from the shoulder on which the bottom of the hopper rests, coming out at the bottom near the back side, as shown at $v$, Fig. 2, in the accompanying drawings. I secure the beam to the stock by a double tenon fitted to corresponding gains on each side of the stock. The handles I fasten together and to the stock and beam in the usual manner.

For separating and conveying the seed in proper quantities for hills from the mass in the hopper to the tube, (the hopper being a little forward of the tube,) I make a ratchet-wheel of cast-iron, (marked $l$, Fig. 3,) which rotates on a pin, $k$, through the center, having eight angular projections or cams on the lower part of the periphery, corresponding with the like number of apertures near the periphery, the apertures being each of the size to hold the required number of kernels for a hill.

To prevent the seed from getting out of the apertures and to enable the operator to see every hill before it is dropped, I construct a wire screen, $w$, by doubling around a wire bail or half-circle a piece of fine screen-wire and then incasing them with sheet-copper. On the ends of the bail I form eyes, by which I fasten the screen $w$ to the back side of the hopper by staples, so as to lie on the wheel $l$. The screen marked $w$, Fig. 4, is kept down to the wheel $l$ by the wire button marked $o$, Fig. 4. The bottom of the tube I bevel to an angle of about forty-five degrees with the plane of the bottom of the plow. To the bevel I secure a valve, (marked $n$, Fig. 2,) of cast-iron, a little larger than the hole, with an arm standing horizontal, or on a plane with the bottom of the plow, so that when the arm is drawn up the valve $n$ stands perpendicular, so as to prevent the seed from remaining on it when opened, and also to cause all the seed to drop all at once instantly. The valve $n$ is secured to the stock by a wire passing through it at the angle of the arm. I place the wheel $l$ on the bottom of the hopper, so that one half of it is in the hopper, under the seed, the other half outside, between the hopper and the top of the stock. In the back side of the hopper I cut two gains directly over the apertures in the wheel $l$. The one under which the seed is brought out by the wheel $l$, I make one-half inch high by a little more than the width of the aperture, over which I secure a stiff brush, $q$, Fig. 5. The other gain I make one-fourth of an inch high by the same width of the other, to admit back into the hopper without clogging any superfluous grains which may pass the brush $q$ and get on the top of the wheel $l$. The false bottom (marked $t$) in the hopper fits close to the top of the wheel $l$, covering it as far as the apertures. From the side of the hopper I cut a space sufficient to slip the wheel $l$ out and in to its place.

For turning the wheel $l$ and opening and shutting the valve $n$, I place an axis, $e$, in the handles, between the rounds, near the center of which is attached the arm $f$, to which is attached the rod $g$ for driving the wheel $l$ and the wire $h$ for operating the valve $n$. Near one end of the axis $e$ is attached another arm, $c$, which connects by the wire $b$ to the hand-lever $a$, by which the valve $n$ is opened and the driving-rod $g$ is drawn back. To the other end of the axis $e$, I fasten a coiled-wire spring, $s$, one end of which is attached to the handle for the purpose of operating the axis $e$ to drive the wheel $l$ and shut the valve $n$. The hand-lever $a$, I make of iron, cast or wrought, having the fulcrum about one-third the length from the handle end. The driving-rod $g$ is held in the right range for striking the cams on the wheel $l$ by passing through an eye in the head of an adjustable screw, $r$, Fig. 3, which is screwed into the side of the stock far enough to cause the rod $g$ to spring enough in drawing back to cause it to strike the cam on the wheel $l$ when returning.

To prevent the velocity of the wheel $l$ from carrying the apertures past the orifice of the tube without stopping, I put a pin, $i$, from the inside of the hopper down through the bottom on that side of the wheel $l$, and far enough from it to admit the end of the rod $g$ to pass between it and the wheel $l$, which prevents the rod $g$ from springing out when the cam strikes it and causes the wheel $l$ to react against the spring-pawl $m$, Fig. 3, which serves the double purpose of effectually filling all the apertures with seed, and also enables the operator to see each hill through the screen $w$, said screen also keeping the seed in the cups of the wheel after being filled until it is dropped into the orifice of the tube $v$. It also prevents the seed from clogging in the apertures when it stops over the tube $v$.

To limit the stroke of the rod $g$ to the length of the space between cams on the wheel $l$, I form a guard or stop by fastening a wire loop, $d\ d$, to the round which supports the handles in which the arm $c$ plays.

To make the trench or furrow for the seed, I make a pointed double mold-board casting, $x$, level on the bottom, one foot long by four inches wide at the back end, and seven inches high, the sides about three-eighths of an inch thick, with a sharp edge in the middle, rising gradually from the point, for the purpose of combining strength and durability and for easily parting the soil, also causing it to run straight and steady.

For covering the seed and leveling and slightly packing the dirt, and also for gaging the thickness of dirt on the seed and preventing the plow from running too deep, I make in one piece with the plow a coverer or leveler, $y$, fourteen inches by seven, with the corners rounded, the back edge being one and three-fourths inch above the plane of the bottom of the plow, rising forward and compressing and separating, so as to form an opening to admit the stock, and joining to the top and back end of the plow. The opening is also large enough back of the stock to admit the operation of the arm of the valve $n$. The plow I fasten to the stock by a bolt, the head of which holds a brace which is bolted to the beam. The coverer I also brace to the stock.

In working my machine the operator drops a hill at his pleasure instantly from the valve, which is within three inches of the bottom of the trench, by simply gripping the hand-lever with the right hand, when the spring $s$ on the end of the axis $e$ reverses the motion, which shuts the valve $n$ and drives the wheel $l$ far enough to discharge the next succeeding aperture filled with seed into the orifice of the tube. For graduating the depth of trenching and gaging the thickness of dirt on the seed, he carries his handles higher or lower, as the case may require.

Having thus fully described my corn-planter, I would state that I do not claim the application of a valve to the bottom of a tube; neither do I claim the construction of a tube for the purpose of conveying seed from the hopper to the ground, for these principles have been variously applied for the same purpose in various machines. Nor do I claim operating an axis by means of a hand-lever and spring attached to the handle of seed-planters, for these also have been used in other machines to effect different purposes, such as drawing slides, reciprocating plates, and opening apertures; but

What I do claim as my invention, and desire to secure by Letters Patent, is—

The rotating ratchet-wheel $l$, provided with feeding-apertures, in combination with the wire screen $w$, or its equivalent, the spring-pawl $m$, guard-pin $i$, and wire button $o$, acting in the manner and for the purpose herein described.

MALENDER BATES.

Witnesses:
NATHAN BATES,
JOHN HUDSTEAD.